July 13, 1926. 1,592,341
W. E. CHANDLER
SIGNAL APPARATUS
Filed June 9, 1925 2 Sheets-Sheet 2
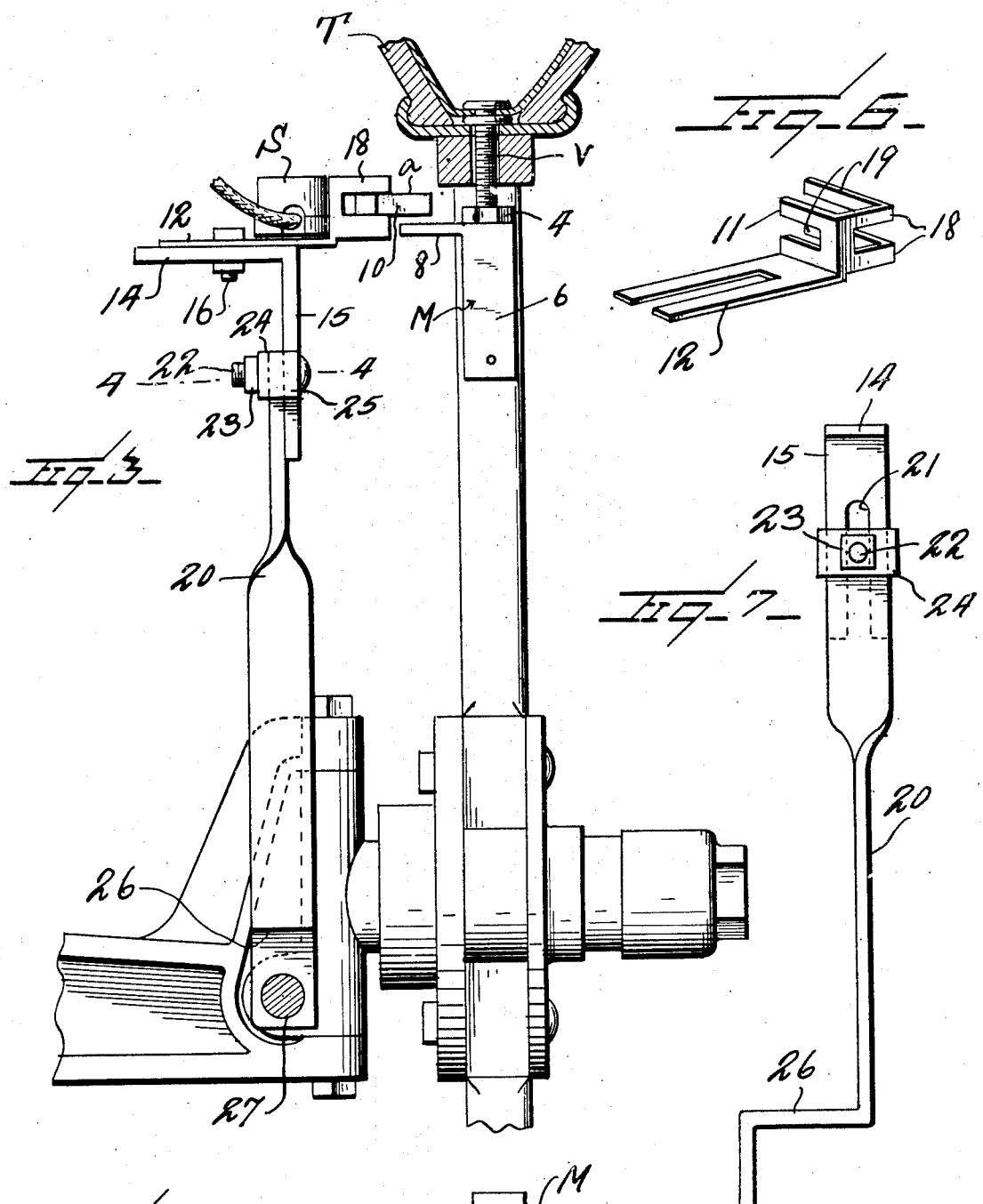
Inventor
W. E. Chandler
By Frederick S. Still
Attorney

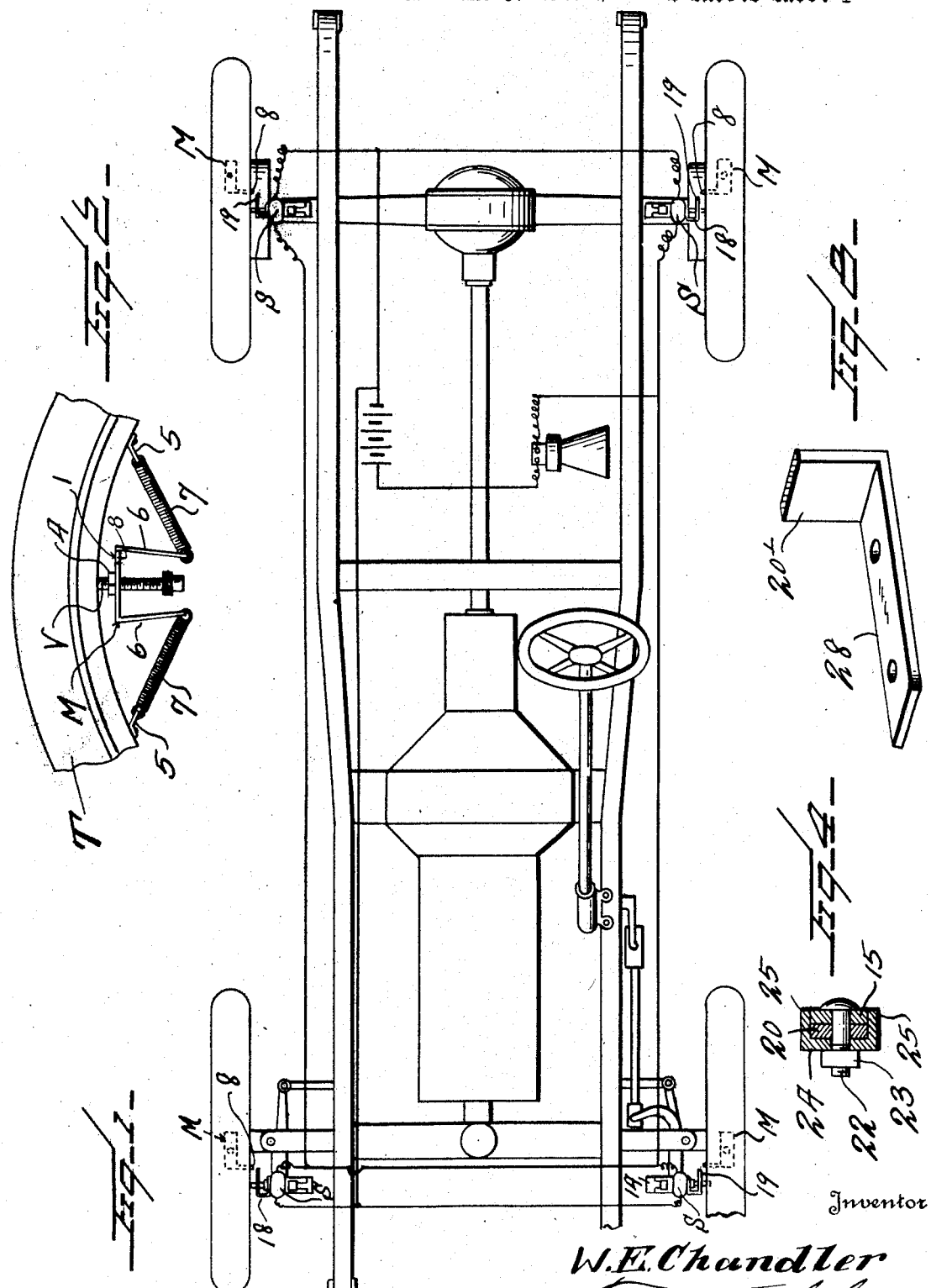

Patented July 13, 1926.

1,592,341

UNITED STATES PATENT OFFICE.

WILLIAM E. CHANDLER, OF ORANGEBURG, SOUTH CAROLINA.

SIGNAL APPARATUS.

Application filed June 9, 1925. Serial No. 36,005.

This invention relates to certain improvements in signal apparatus and has relation more particularly to a device of this general character especially designed and adapted for use in connection with pneumatic tires, and it is primarily an object of the invention to provide an apparatus of this kind operating in substantially an automatic manner to give warning when the pressure within a tire has decreased to what may be termed the danger point.

Another object of the invention is to provide an apparatus of this general character which coacts with the horn or other signal on a vehicle to indicate when a tire has become unduly deflated.

An additional object of the invention is to provide a device of this general character which may be adjusted or regulated to compensate for varying degrees of air pressure within a tire.

Another object of the invention is to provide an apparatus of this general character which is inoperative when the pressure within the tire is above the danger point or substantially normal but which functions when such pressure decreases below such danger point.

Furthermore, it is an object of the invention to provide an apparatus of this general character comprising parts which may be adjusted to different positions as the necessities of practice may require and in accordance with the size and character of the tire with which it is adapted to coact.

A still further object of the invention is to provide an apparatus of this character which functions in a manner to indicate when a tire has become unduly deflated and thereby avoids the necessity of the driver or other occupant of the vehicle from inspecting from time to time the condition of the tires.

The invention consists in the details of construction and in the combination and arrangement of the several parts of my improved signal apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan and of a diagrammatic character illustrating a signal apparatus constructed in accordance with an embodiment of my invention;

Figure 2 is a fragmentary view in side elevation of a wheel having applied thereto certain parts of the apparatus as herein employed;

Figure 3 is an enlarged fragmentary view partly in elevation and partly in section illustrating in detail features of the apparatus as herein embodied;

Figure 4 is a sectional view taken substantially on the line 4—4 of Figure 3;

Figure 5 is a view partly in top plan and partly in section of the structure as illustrated in Figure 3 with certain of the parts omitted;

Figure 6 is a view in perspective of the plate herein employed for supporting a circuit closer;

Figure 7 is a view in side elevation of a supporting post and the arm adjustably engaged therewith;

Figure 8 is a fragmentary view in perspective illustrating a modified form of post.

As disclosed in the accompanying drawings, M denotes a substantially U-shaped member the intermediate or base portion 1 of which being provided at its center with an opening 2 to permit the member M to be readily applied to the inflating valve stem V for a tire T. When so applied, the member M has direct contact with the conventional valve stem nut 4. As the member M is free upon the valve stem V, it will be readily understood that upon rotation of this nut 4 in one direction, the member M will be moved outwardly of the stem for a purpose which will hereinafter be more particularly referred to. The intermediate or base portion 1 of the member M is disposed in a direction circumferentially of the rim of the wheel and arranged at suitable points in front and to the rear of the applied member M or more particularly the valve stem V are the clips 5 secured directly to the wheel rim. Interposed between and connecting each of the clips 5 and the outer end extremity of the adjacent side arm 6 of the member M is a retractile member 7, herein disclosed as a coil spring. The members or springs 7 are of requisite tension and operate to constantly urge the member M toward the wheel rim and with the base or intermediate portion 1 of said member constantly in contact with the nut 4.

The intermediate or base portion 1 of the member M preferably at an end thereof is provided with an outstanding and laterally directed finger 8 which extends beyond the inner side or face of the wheel, said finger serving, when the tire T has become deflated to a predetermined degree and more especially below the danger point, as a trip for the switch mechanism S.

The switch may consist of any preferred type of pull chain switch including a longitudinally shiftable operating chain or kindred flexible member 9, alternate operations of which cause the contacts (not shown) to be alternately shifted to "on" and "off" positions. The member 9 extends within an elongated tubular handle 10 and is secured therein, the inner end of said tubular handle fulcruming on the switch casing so that movement of the handle in either direction will cause an operation of the contacts of the switch. It will of course be obvious that instead of such a switch as this described any switch might be employed having an operating member mounted for oscillation in either direction from a common central position wherein an operation of the operating member causes the contacts of the switch to be engaged and the next operation causes the contacts to be disengaged without regard to the direction of such operation. Such a switch is disclosed in Patent, No. 1,509,506, issued September 23, 1924, to D. D. Gordon.

The switch mechanism S is suitably affixed or held to a flange 11 carried by an elongated plate 12, said flange 11 being preferably perpendicularly related to the plate 12. The plate 12 overlies a lateral extension 14 of an arm 15 and is held to said extension 14 by a conventional bolt and nut 16 directed through a longitudinally disposed slot 17 in the plate 12. By this means, the plate 12 may be adjusted longitudinally as required and fixedly held in desired selected adjustment by the bolt and nut 16. The flange 11 is provided at one end with a pair of outstanding arms 18 having their outer ends continued by the spaced guide arms 19 disposed in advance of the flange 11 and forwardly of the switch mechanism S. Extending between these guide arms 19 is the tubular operating member 10, said member having opposed flat faces $a$ substantially in contact with the opposed edges of the guide arms 19 whereby the member 10 is effectively held for swinging movement in a fixed path of travel.

The arm 15 is adjustably connected with the upper end portion of a post 20, such adjustable connection being herein disclosed as comprising a longitudinally disposed slot 21 in the lower end portion of the arm 15 through which passes a bolt 22, said bolt being also directed through the upper portion of the post 20. Coacting with the bolt 22 is a conventional nut 23 which has direct engagement with a washer bolt 24, the extremities of which being provided with the laterally disposed flanges 25 which overlie the longitudinal edges of the arm 15 whereby said arm 15 is held against rotation about the bolt 22. The lower part of the post 20 is twisted at substantially right angles to the upper part of said post and the lower end of the post 20 is provided with a substantially L-shaped lateral extension 26 with the foot thereof downwardly directed. The foot 26 is provided with an opening 27 whereby the same may be readily engaged with the spindle arm of the front wheel mounting and held thereto by the conventional spindle arm nut. By this means it will be readily understood that as a steering wheel is moved laterally the post 20 will have correspondent movement so that at all times the switch mechanism S will be maintained in desired position with respect to the tire T.

The switch mechanism coating with each of the rear or drive wheels is carried by a structure similar to that as just described except that the lower portion of the post 20' is provided with a lateral extension 28 which may be bolted or otherwise held to the rear axle housing.

The contacts comprised in each of the switch mechanisms S is in proper electrical connection with the operating circuit for a horn or kindred signal carried by the vehicle so that when any one of the switch mechanisms is closed a resultant operation of such signal will be effected.

In practice, the plate 12 is properly adjusted with respect to the extension 14 and the arm 15 is properly adjusted with respect to the post 20 or 20' to bring the operating member 10 of the switch mechanism within the path of travel of the finger or trigger 8 when the pressure within the tire T has decreased to a predetermined degree or more especially when the deflation of such tire is at the danger point. It is to be understood that when the tire T is under normal pressure, the finger or trigger 8 travels in a path entirely free of the member 10 so that under this latter condition the wheel rotates without in any way affecting the switch mechanism. When the pressure within the tire does decrease to substantially the danger point, the continued rotation of the wheel will cause the finger or trigger 8 to strike the member 10, the first blow causing the member 10 to close the switch mechanism to operate the signal within the car while the next succeeding blow opens such switch mechanism so that as the wheel continues to rotate the warning signal within the car is intermittently operated and thereby notifies the occupant of the vehicle that a tire needs attention.

It is to be understood that as the member M is forced outwardly of the valve stem V by the requisite turning of the nut 4, the members or springs 7 will place the member M under desired tension depending upon the normal air pressure within the tire T. It is also to be understood that when the tire is under normal pressure, the nut 4 will be moved outwardly with the stem V a distance to place the springs 7 under tension but in the event it is not believed such tension to be sufficient, the nut 4 may be properly rotated to obtain the desired increased tension. Furthermore, it is to be understood that as the pressure within the tire decreases the stem V under the tension of the springs 7 will move slightly inwardly of the tire and when substantially the danger point has been reached the nut 4 will be in close contact with the rim and at which time the finger or trigger 8 will be drawn into the path of travel of the member 10 associated with the switch mechanism.

Particular attention is directed to the fact that by the construction hereinbefore recited a contact for operating the signal is maintained throughout alternate rotations of the wheel upon which the tire becomes deflated. This feature is important in that where only a passing contact is obtained for completion of the signal circuit it is necessary to provide in combination with the signal switch some form of register for determining whether the contact has been made, as otherwise at high speeds the operation of the signal would be of such short duration as to be either inaudible or completely sufficient for any operation of the signal. With this construction it is possible to use a signal whose response is not immediate to the application of current such as the ordinary Klaxon horn with which automobiles are substantially universally equipped. In such horns there is no audible note until the motor attains a predetermined speed which it cannot attain immediately upon the application of current thereto. Furthermore, with a device of this character application of the signal while the vehicle is at rest is absolutely prevented. If a tire deflates at such a time the operator receives his warning only when the motion is applied to the vehicle, for the trip of trigger 8 can not operate the handle 10 by engagement therewith radially of the rotatable member. It will be obvious that in signals of this character where operation of the signal is possible while the vehicle is standing such an application might occur while the operator is away from his vehicle with the result that undue drain upon the battery will result, possibly rendering the battery and starter of the car inoperative as well as subjecting the signal itself to unnecessary hardship.

From the foregoing description it is thought to be obvious that a signal apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In signaling apparatus for indicating deflation of the tires of a vehicle, in combination with a vehicle wheel having an inflatable tire normally inflated to a predetermined degree, a support adjacent to and in fixed relation to the wheel, a switch carried by the support including an operating arm swingable in a plane tangential to a circumference concentric with the wheel, said arm being normally disposed in a central position that is perpendicular to the wheel, movement of the arm in either direction causing the contacts of the switch to close, the arm returning to its normal position when released, a second movement of the arm from its normal position causing the contacts of the switch to open, a trip carried by the wheel and normally operating upon a circumference other than the circumference mentioned, and means shifting said trip to the first named circumference upon deflation of the tire to a predetermined degree.

2. In a signaling apparatus for indicating deflation of the tires of a vehicle, in combination with a vehicle wheel having an inflatable tire normally inflated to a predetermined degree, a support adjacent to and in fixed relation to the wheel, a switch carried by the support including an operating arm swingable in a plane tangential to a circumference concentric with the wheel, said arm being normally disposed in a central position that is perpendicular to the wheel, movement of the arm in either direction causing the contacts of the switch to close, the arm returning to its normal position when released, a second movement of the arm from its normal position causing the contacts of the switch to open, a trip carried by the wheel and normally operating upon a circumference other than the circumference mentioned, springs constantly urging the trip radially outwardly upon the wheel, and a member resisting outward movement of the trip with the pressure of said tire.

3. The combination with the wheel of an automobile having a tire casing, inner tube, and valve stem carried by the inner tube, the valve stem being capable of moving radially with relation to the wheel when the inner tube is deflated, a trip element mounted upon the exterior of the valve stem and leaving the inner end of the valve stem unobstructed, and signal means including a coacting signal operating element supported near the wheel and adapted to be engaged by the trip element when it is shifted upon the deflation of the inner tube.

4. The combination with the wheel of an automobile having a tire casing, inner tube, and valve stem carried by the inner tube, the valve stem being capable of moving radially outwardly with relation to the wheel when the inner tube is deflated, a trip element mounted upon the exterior of the valve stem and leaving the inner end of the valve stem unobstructed, resilient means tending to move the valve stem radially outwardly, and signal means including a coacting signal operating element supported near the wheel and adapted to be engaged by the trip element when it is shifted upon the deflation of the inner tube.

5. The combination with the wheel of an automobile having a tire casing, inner tube, and valve stem carried by the inner tube, the valve stem being capable of moving radially outwardly with relation to the wheel when the inner tube is deflated, a trip element mounted upon the exterior of the valve stem, a resilient element connected between the trip element and wheel and tensioned to shift the trip element outwardly, and signal means including a coacting signal operating element supported near the wheel and adapted to be engaged by the trip element when it is shifted upon the deflation of the inner tube.

6. The combination with the wheel of an automobile having a tire casing, inner tube and valve stem carried by the inner tube, a stop element mounted upon the valve stem and normally spaced from the periphery of the wheel so that the valve stem may move radially outwardly upon the deflation of the inner tube, a U-shaped element provided in its bight with an opening for receiving the valve stem, such bight engaging the stop element, the arms of the U-shaped element extending on opposite ends of the inner end of the valve stem so that it is left unobstructed, springs connecting the arms of the U-shaped element with the outer portion of the wheel and tending to shift the U-shaped element outwardly, said U-shaped element carrying a trip, and signal means including a coacting signal operating element supported near the wheel and adapted to be engaged by the trip when it is shifted outwardly upon the deflation of the inner tube.

In testimony whereof I affix my signature.

WILLIAM E. CHANDLER.